United States Patent [19]

Lee

[11] Patent Number: 5,617,144
[45] Date of Patent: Apr. 1, 1997

[54] IMAGE PROCESSING SYSTEM USING PIXEL-BY-PIXEL MOTION ESTIMATION AND FRAME DECIMATION

[75] Inventor: Min-Sub Lee, Seoul, Rep. of Korea

[73] Assignee: Daewoo Electronics Co., Ltd., Seoul, Rep. of Korea

[21] Appl. No.: 452,627

[22] Filed: May 25, 1995

[30] Foreign Application Priority Data

Mar. 20, 1995 [KR] Rep. of Korea .................. 95-5869

[51] Int. Cl.⁶ .................................................. H04N 7/32
[52] U.S. Cl. ........................................ 348/416; 348/699
[58] Field of Search .................................... 348/384, 390,
348/400–405, 407, 409–413, 415, 416,
699; 382/232, 236, 238; H04N 7/137

[56] References Cited

U.S. PATENT DOCUMENTS 5,105,271  4/1992  Niihara ................................ 348/409
5,363,146  11/1994 Saunders et al. .................... 348/699
5,398,078  3/1995  Masuda et al. ...................... 348/416
5,418,569  5/1995  Ando ................................... 348/415
5,453,801  9/1995  Kim ..................................... 348/699

*Primary Examiner*—Tommy P. Chin
*Assistant Examiner*—Richard Lee
*Attorney, Agent, or Firm*—Pennie & Edmonds

[57] ABSTRACT

An image processing system for processing a video signal includes an encoder and a decoder, wherein the encoder comprises a frame decimator for selecting a plurality of frames from the video signal, a unit for creating M number of candidate frames for each of the non-selected frames, i.e., skipped frames by using M number of skipped frame prediction factors, and a unit for comparing each of the N skipped frames with each of the candidate frames to transmit a skipped frame prediction factor for each of the N skipped frames to the decoder; and the decoder comprises a unit for deciding each of the N skipped frames between the previous frame and the reconstructed current frame by using the transmitted skipped frame prediction factor.

4 Claims, 6 Drawing Sheets

IMAGE PROCESSING SYSTEM USING PIXEL-BY-PIXEL MOTION ESTIMATION AND FRAME DECIMATION

FIELD OF THE INVENTION

The present invention relates to an image processing system for encoding and decoding a video signal; and, more particularly, to an image processing system for encoding and decoding a video signal by using a motion estimation and compensation technique and a frame decimation process.

DESCRIPTION OF THE PRIOR ART

As is well known, transmission of digitized video signals can deliver video images of much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data through the limited channel bandwidth, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse code modulation), two-dimensional DCT(discrete cosine transform), quantization of DCT coefficients, and VLC(variable length coding). The motion compensated DPCM is a process of determining the movement of an object between a current frame and its previous frame, and predicting the current frame according to the motion flow of the object to produce a differential signal representing the difference between the current frame and its prediction. This method is described, for example, in Staffan Ericsson, "Fixed and Adaptive Predictors for Hybrid Predictive/Transform Coding", *IEEE Transactions on Communications*, COM-33, No. 12(December 1985); and in Ninomiya and Ohtsuka, "A Motion-Compensated Interframe Coding Scheme for Television Pictures", *IEEE Transactions on Communications*, COM-30, No. 1 (January 1982).

Specifically, in the motion compensated DPCM, current frame data is predicted from the corresponding previous frame data based on an estimation of a motion between the current and the previous frames. Such estimated motion may be described in terms of two dimensional motion vectors representing the displacement of pixels between the previous and the current frames.

There have been two basic approaches to estimate the motion or displacement of pixels of an object: one is a block-by-block estimation; and the other is a pixel-by-pixel approach.

In the block-by-block motion estimation, a block in the current frame is compared with blocks in its previous frame until a best match is determined. From this, an interframe displacement vector (which indicates how much the block of pixels has moved between the frames) for the whole block can be estimated for the current frame being transmitted. However, in the block-by-block motion estimation, poor estimates may result if all pixels in the block do not move in a same way, to thereby decrease the overall coding efficiency.

In case of the pixel-by-pixel estimation, on the other hand, a displacement is determined for each and every pixel. Accordingly, this technique allows a more accurate estimation of the pixel value and has the ability to easily handle scale changes (e.g., zooming, movement perpendicular to the image plane). However, in the pixel-by-pixel approach, since a motion vector is determined at each and every pixel, it is virtually impossible to transmit all of the motion vector data to a receiver. Therefore, motion vectors for a set of selected pixels, i.e., feature points, are transmitted to a receiver, wherein each of the feature points is defined as a pixel capable of representing its neighboring pixels so that motion vectors for non-feature points can be recovered from those of the feature points at the receiver. In an encoder which adopts the motion estimation based on feature points, as disclosed in a copending commonly owned application, U.S. Ser. No. 08/367,520, entitled "Method and Apparatus for Encoding a Video Signal Using Pixel-by-pixel Motion Estimation", a number of feature points are first selected from all of the pixels contained in the previous frame. Then, motion vectors for the selected feature points are determined, wherein each of the motion vectors represents a spatial displacement between one feature point in the previous frame and a corresponding matching point, i.e., a most similar pixel, in the current frame. Specifically, the matching point for each of the feature points is searched in a search region within the current frame, wherein the search region is defined as a region of a predetermined area which encompasses the position of the corresponding feature point.

Another compression technique which can be implemented readily is a frame decimation method, which reduces the amount of data by way of encoding and transmitting only certain selected frames of video image and skipping or decimating the remaining frames existing therebetween(see, e.g., "Video Codec for Audiovisual Services at p×64 kb/s," CCITT Recommendation H.261, CDM XV-R 37-E, International Telegraph and Telephone Consultative Committee (CCITT), August 1990).

Usually, an input to a video encoder is a video signal of 30 frames/sec. The frame rate resulting from the skipping of one, two or three frames between every two encoded frames is typically 15, 10 or 7.5 frames/sec, respectively.

In a decoder corresponding to such encoder using the skipping technique, each skipped frame is estimated based only on its neighboring decoded frames so as to reconstruct the video signal of 30 frames/sec. Since the estimated skipped frame is made without employing any actual information of a corresponding original skipped frame, it may not be able to reproduce the exact features of the original skipped frame, thereby lowering the overall quality of the display image.

SUMMARY OF THE INVENTION

It is, therefore, a primary object of the invention to provide an improved image processing system for encoding and decoding a video signal by employing a motion estimation and compensation technique on a pixel-by-pixel basis using feature points and further employing a skipped frame prediction factor which facilitates the estimation of a skipped frame.

In accordance with the invention, there is provided an image processing system for processing a video signal including means for encoding the video signal to provide an encoded signal and means for decoding the encoded signal to provide a reconstructed video signal, characterized in that said encoding means comprises:

means for selecting a plurality of frames inclusive of a current frame and a previous frame from the video signal, wherein N frames are skipped between the previous frame and the current frame, said N being a positive integer;

means for estimating displacements between the previous frame and the current frame to provide a set of motion vectors representative of the estimated displacements and compensating the previous frame through the use of the set of motion vectors to provide a predicted current frame on a pixel-by-pixel basis;

means for subtracting the predicted current frame from the current frame to provide a difference signal and encoding the difference signal and the set of motion vectors, to thereby provide an encoded difference signal and an encoded set of motion vectors to the decoding means;

means for compensating the previous frame by using the set of motion vectors multiplied by M number of skipped frame prediction factors to provide M number of candidate frames, said M being a positive integer larger than N; and means for comparing each of the N skipped frames with each of the M candidate frames to transmit one of the M skipped frame prediction factors for each of the N skipped frames to the decoding means;
and that said decoding means comprises:

means for decoding the encoded difference signal and the encoded set of motion vectors, to thereby recover the difference signal and the set of motion vectors;

means for initially compensating the previous frame by using the recovered set of motion vectors to reconstruct the predicted current frame;

means for adding the recovered difference signal to the reconstructed predicted current frame to thereby reconstruct the current frame; and means for further compensating the previous frame by using the recovered set of motion vectors and each of the transmitted skipped frame prediction factors for each of the N skipped frames, to thereby construct each of the N skipped frames between the previous frame and the reconstructed current frame.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
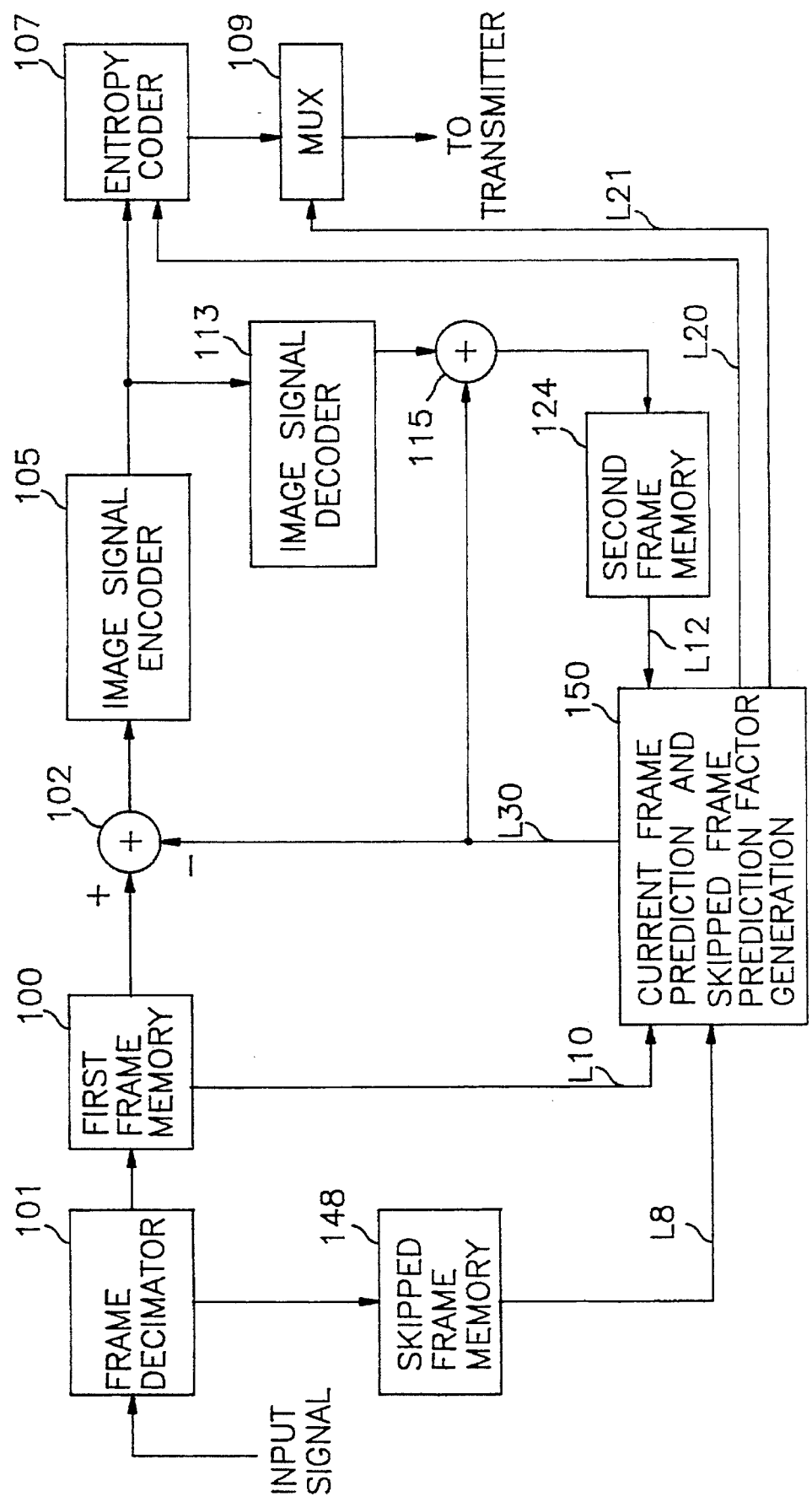
FIG. 1 is a video signal encoder having a current frame prediction and skipped frame prediction factor generation block in accordance with the present invention.

FIG. 1 describes a video signal encoder employing a motion estimation and compensation technique on a pixel-by-pixel basis and a frame decimation process. As shown, an input signal is fed to a frame decimator 101. At the frame decimator 101, the frames to be encoded are selected by skipping the intervening frames therebetween at a predetermined frame decimation ratio representing the degree of decimation, and fed to a first frame memory 100. For example, the frame decimator 101 selects or uses every other or every third frame of the video signal if the predetermined decimation ratio is 2 or 3, respectively. The skipped frames are stored in a skipped frame memory 148.

As shown in FIG. 1, the selected signal is stored at the first frame memory 100 which is connected to a subtractor 102 and to a current frame prediction and skipped frame prediction factor generation block 150 through a line L10.

In the current frame prediction and skipped frame prediction factor generation block 150, a current frame signal on the line L10 retrieved from the first frame memory 100, a skipped frame signal on a line L8 retrieved from the skipped frame memory 148 and a reconstructed previous frame signal on a line L12 from a second frame memory 124 are processed to predict the current frame on a pixel-by-pixel basis to generate a predicted current frame signal onto a line L30 and a set of motion vectors for feature points onto a line L20 and a skipped frame prediction factor for each of the skipped frames onto a line L21. Details of the current frame prediction and skipped frame prediction factor generation block 150 will be described with reference to FIGS. 2 and 3.

The predicted current frame signal on the line L30 is subtracted from a current frame signal at the subtractor 102, and the resultant data, i.e., an error signal denoting a differential pixel value, is dispatched to an image signal encoder 105, wherein the error signal is encoded into a set of quantized transform coefficients by using, e.g., a DCT and any of the known quantization methods. Thereafter, the quantized transform coefficients are transmitted to an entropy coder 107 and an image signal decoder 113. At the entropy coder 107, the quantized transform coefficients from the image signal encoder 105 and the motion vectors fed through the line L20 from the current frame prediction block 150 are coded together by using, e.g., a variable length coding technique for the transmission thereof. A multiplexer 109 multiplexes the output signal of the entropy coder 107 and the skipped frame prediction factor transmitted through the line L21 from the current frame prediction and skipped frame prediction factor generation block 150. Thereafter, the multiplexed signal is provided to a transmitter(not shown) for the transmission thereof.

In the meantime, the image signal decoder 113 converts the quantized transform coefficients from the image signal encoder 105 back to a reconstructed error signal by employing an inverse quantization and an inverse discrete cosine transform. The reconstructed error signal from the image signal decoder 113 and the predicted current frame signal on the line L30 from the current frame prediction and skipped frame prediction factor generation block 150 are combined at an adder 115 to thereby provide a reconstructed current frame signal to be stored as a previous frame in the second frame memory 124.

Figure 2:
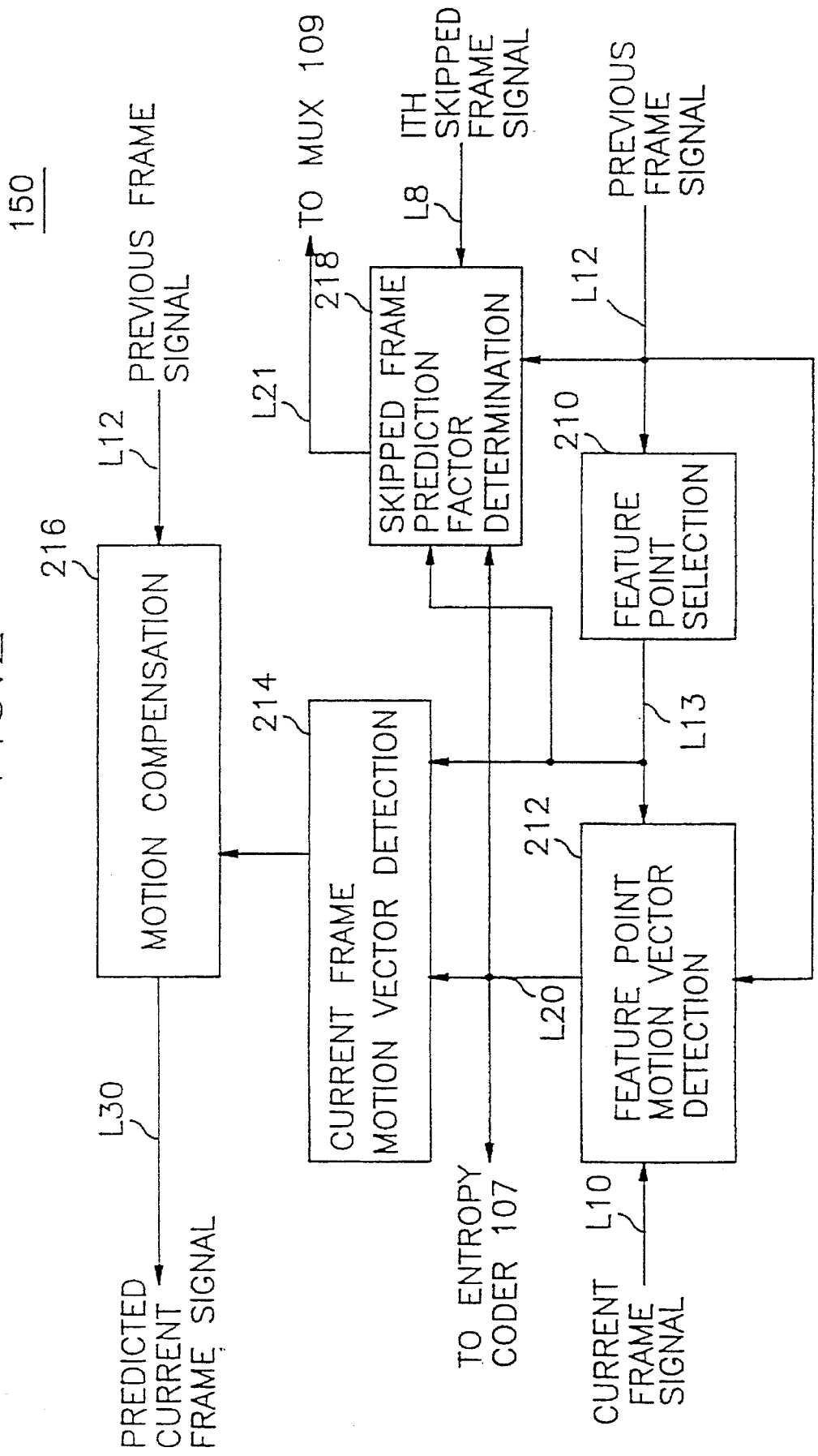
FIG. 2 shows a detailed block diagram of the current frame prediction and skipped frame prediction factor generation block of FIG. 1.

Referring to FIG. 2, there are illustrated details of the current frame prediction and skipped frame prediction factor generation block 150 shown in FIG. 1. A previous frame signal on the line L12 from the second frame memory 124 is inputted to a feature point selection block 210, a feature point motion vector detection block 212, a motion compensation block 216 and a skipped frame prediction factor determination block 218.

At the feature point selection block 210, a number of feature points are selected among the pixels contained in the previous frame. Each of the feature points is defined as a pixel which is capable of representing the motion of an object in the frame. The selected feature points from the feature point selection block 210 are inputted to the feature point motion vector detection block 212, a current frame motion vector detection block 214 and the skipped frame prediction factor determination block 218. The current frame signal on the line L10 is provided to the feature point motion vector detection block 212.

At the feature point motion vector detection block 212, a first set of motion vectors for the selected feature points is detected. Each of the first set of motion vectors represents a spatial displacement between a feature point in the previous frame and a most similar pixel thereto in the current frame.

After detecting the motion vectors for all the feature points, the first set of motion vectors is provided to the current frame motion vector detection block 214, the skipped frame prediction factor determination block 218 and the entropy coder 107(shown in FIG. 1) via the line L20.

In the current frame motion vector detection block 214, a second set of motion vectors for all the pixels contained in the current frame is determined by using the first set of motion vectors from the feature point motion vector detection block 212 and the selected feature points from the feature point selection block 210. In order to determine the second set of motion vectors, first, a set of motion vectors for "quasi-feature points", each of which representing a pixel point in the current frame shifted from each of the feature points in the previous frame by each of the first set of motion vectors, is determined. The magnitude of a motion vector for a quasi-feature point is identical to the motion vector for its corresponding feature point, except that the direction of the two motion vectors is opposite. After having determined the motion vectors for all of the quasi-feature points, motion vectors for non-quasi-feature points, which are the remaining pixel points in the current frame, are determined as follows.

Figure 3:
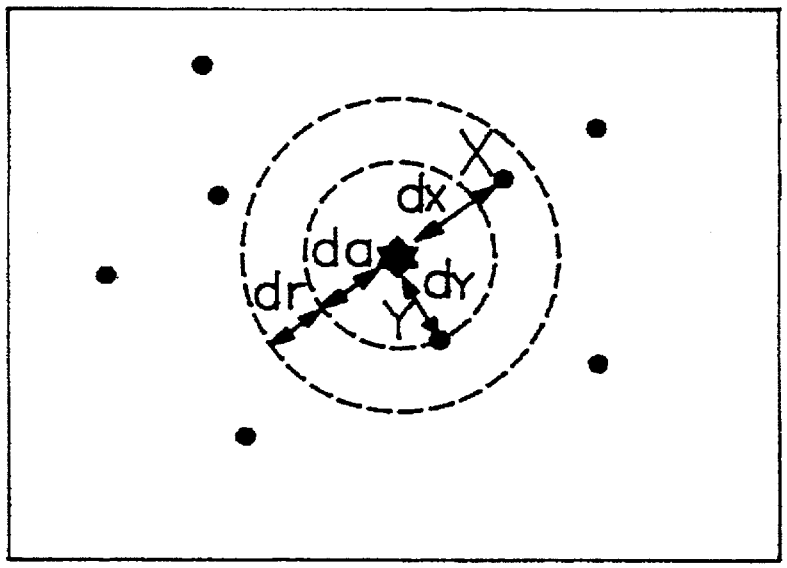
FIG. 3 describes a method for detecting a motion vector for a non-quasi-feature point.

As shown in FIG. 3, a number of quasi-feature points are irregularly distributed in the entire current frame. A motion vector for a star-marked non-quasi-feature point is calculated by averaging those for the quasi-feature points which are placed within a circle boundary having a radius of $d_r+d_a$, wherein $d_a$ is the distance to the nearest quasi-feature point from the star market pixel position, and $d_r$ is a predetermined expanded radius for including other quasi-feature points to be used in the motion vector calculation. For example, if the nearest quasi-feature point is "Y", and the quasi-feature point "X" is located within the boundary of $d_a+d_r$, the motion vector ($MV_x$, $MV_y$) for the star marked pixel is calculated as:

$$(MV_x,MV_y) = \frac{\frac{1}{d_X}(MV_x,MV_y)_X + \frac{1}{d_Y}(MV_x,MV_y)_Y}{\frac{1}{d_X} + \frac{1}{d_Y}}$$

wherein $d_x$ and $d_y$ are the respective distances of quasi-feature points X and Y from the star marked pixel position; and $(MV_x, MV_y)_X$ and $(MV_x, MV_y)_Y$ are the respective motion vectors for the quasi-feature points.

Referring back to FIG. 2, the second set of motion vectors for quasi-feature points and non-quasi feature points are provided to the motion compensation block 216. In the motion compensation block 216, each of the pixels to be contained in a predicted current frame is retrieved via the line L12 from the second frame memory 124(shown in FIG. 1) by using each of the second set of motion vectors.

In the meantime, the skipped frame prediction factor determination block 218 creates M number of candidate frames for each of the N skipped frames; and compares each of the skipped frames with each of the M candidate frames to provide a skipped frame prediction factor for each of the skipped frames to the multiplexer 109(shown in FIG. 1). Definition of the skipped frame prediction factor and the candidate frames, and details of the skipped frame prediction factor determination block 218 will be described with reference to FIGS. 4A, 4B and 5.

Figure 4A:
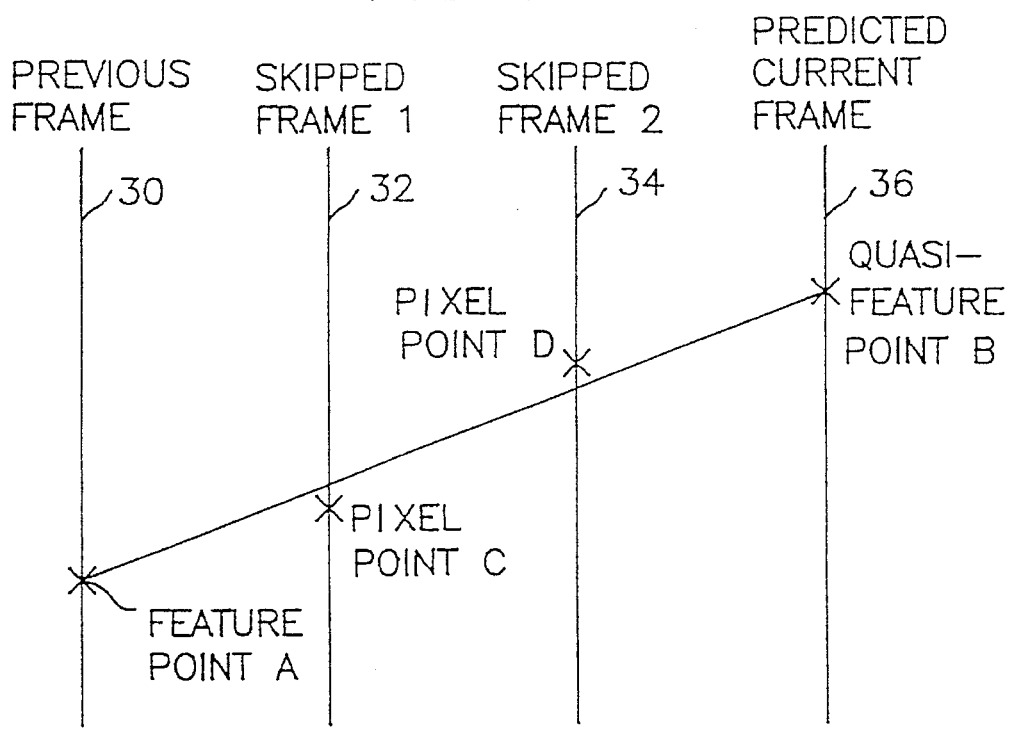
FIGS. 4A and 4B depict a number of exemplary frames to define a candidate frame.
Figure 4B:
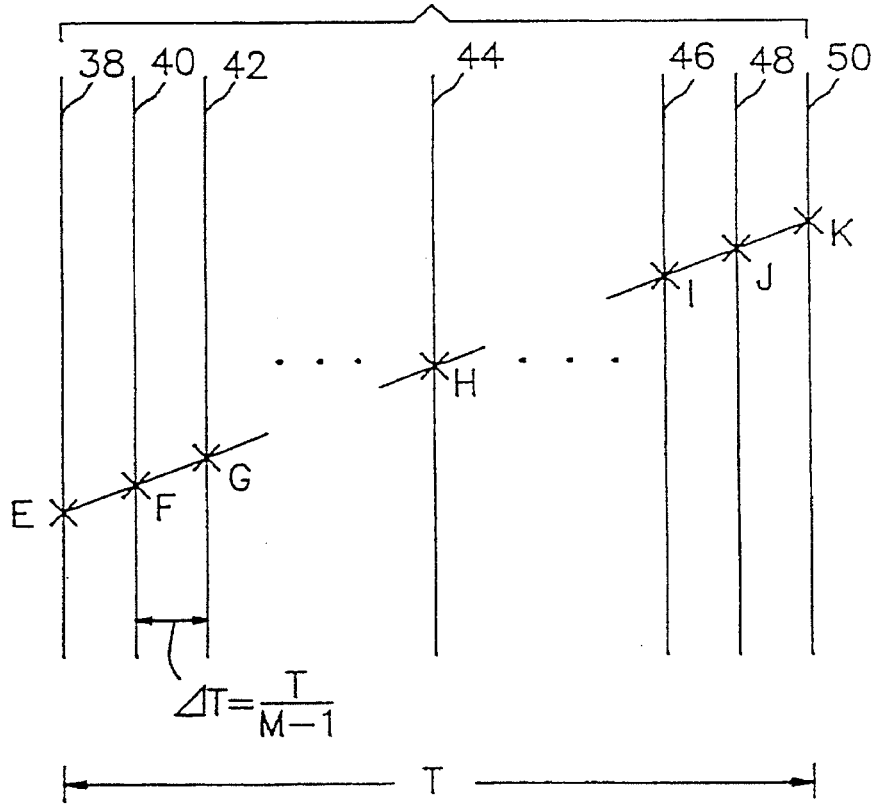

Referring to FIGS. 4A and 4B, there are schematically illustrated a number of frames to define the candidate frames. In FIG. 4A, there are shown four frames: a previous frame 30, a first skipped frame 32, a second skipped frame 34 and a predicted current frame 36. For the purpose of illustration, the number of skipped frames between the previous frame 30 and the predicted current frame will be assumed to be two, and only one of the feature points and its corresponding quasi-feature point are marked as feature point A at the previous frame 30 and as quasi-feature point B at the predicted current frame 36, respectively. And, pixel points at the first and the second skipped frames 32 and 34 corresponding to the feature point A at the previous frame 30 are indicated as one pixel point C and another pixel point D, respectively.

As shown in FIG. 4A, the pixel point C in the first skipped frame 32 and the pixel point D in the second skipped frame 34 are not placed on the line between the feature point A and the quasi-feature point B. This means that the position of the pixel point C or D in the first skipped frame 32 or 34 corresponding to the feature point A in the previous frame 30 does not coincide with a position which is proportional to the time gap between the previous frame 30 and the predicted current frame 36, i.e., the intersection between the line and the skipped frame 32 or 34. However, if the feature point A in the previous frame 30 linearly moves to the quasi-feature point B in the predicated current frame 36, both the pixel points C and D will be aligned substantially on the line between the feature point A and the quasi-feature point B. In this case, it is possible to approximate each position of the pixel points C and D by sequentially arranging a number of candidate feature points on the line between the feature point A and the quasi-feature point B. For example, as shown in FIG. 4B, a number of candidate feature points E to K are designated on the line between the candidate feature point E and the candidate feature point K, wherein the candidate feature points E and K are identical to the feature point A and the quasi-feature point B, respectively. The selection of one candidate feature point is accomplished by comparing each of the skipped frames 32 and 34 with M number of candidate frames, each of which is constructed based on a number of candidate feature points contained therein.

The construction method for the M number of candidate frames is identical to that of the predicted current frame performed at both the current frame motion vector detection block 214 and the motion compensation block 216 in FIG. 2, except that quasi-feature points in the predicted current frame are replaced with the candidate feature points contained in each of the candidate frames. For example, as shown in FIG. 4B, if the time interval between the first candidate frame 38 and the Mth candidate frame 50 is T, and the gap ΔT between two candidate frames is T/(M-1), wherein M is an integer larger than 2, determination of one candidate feature point and its motion vector in a jth candidate frame may be made as follows.

A candidate feature point in the jth candidate frame is determined by translating the feature point A in the previous frame 30 by a factor of (j-1)/(M-1) multiplied by the motion vector between the feature point A and the quasi-feature point B, and the motion vector between the candidate feature point position in the jth candidate frame and the feature point A in the previous frame 30 is determined by multiplying the motion vector between the feature point A and the quasi-feature point B by the factor of (j-1/(M-1).

Figure 5:
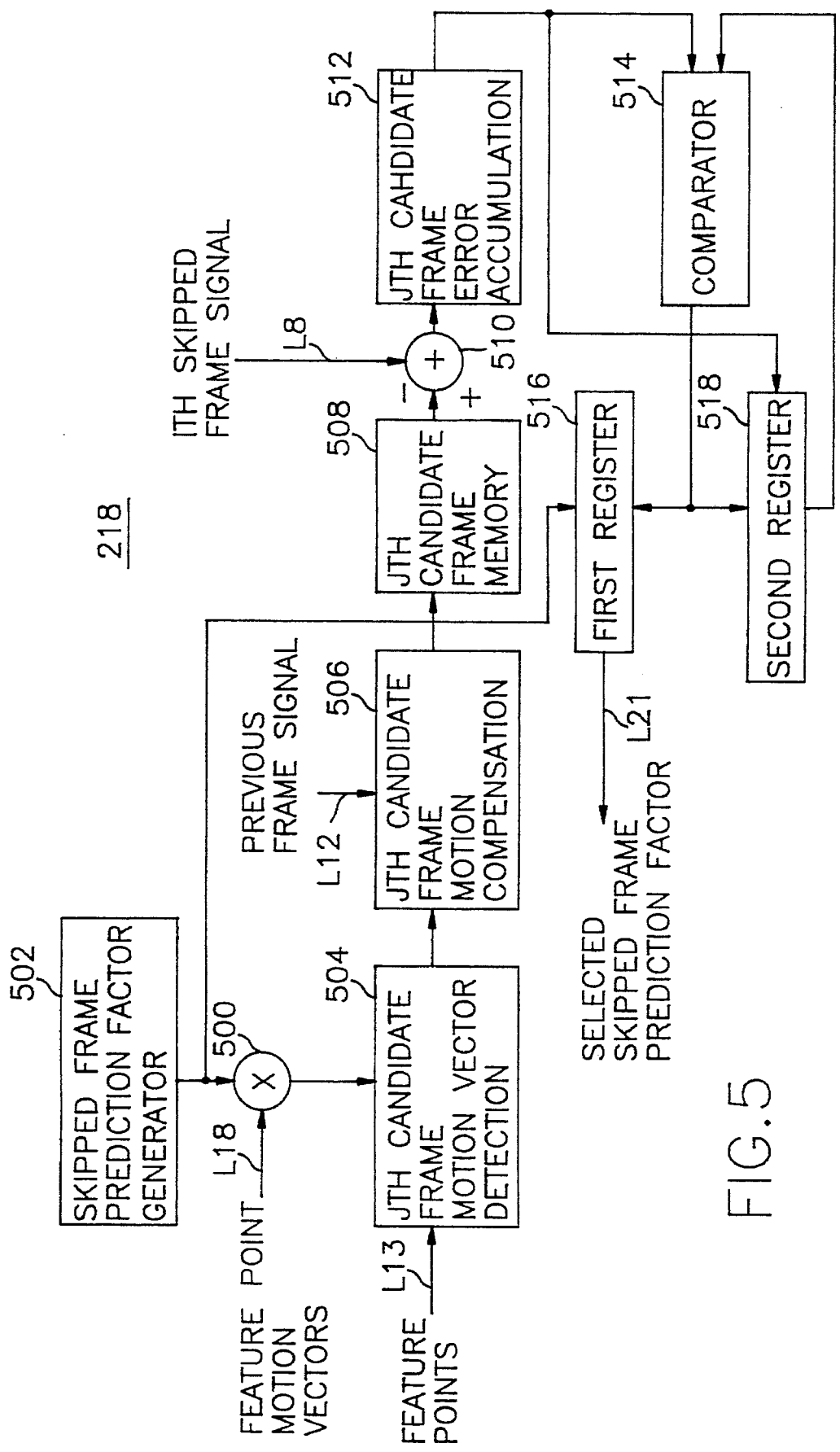
FIG. 5 represents a detailed block diagram of the skipped frame prediction factor determination block of FIG. 2.

Referring to FIG. 5, there is depicted a detailed block diagram of the skipped frame prediction factor determination block 218 of FIG. 2. As shown in FIG. 5, the feature point motion vectors determined at the feature point motion vector detection block 212(shown in FIG. 2) are provided via a line L18 to a multiplier 500. In the meantime, a predetermined value of skipped frame prediction factor for each candidate frame is also provided from a skipped frame prediction factor generator 502 to the multiplier 500, wherein the feature point motion vectors multiplied by a jth skipped frame prediction factor are provided to a jth candidate frame motion vector detection block 504. The skipped frame prediction factor for the jth candidate frame, which is (j-1)/(M-1) as described in FIGS. 4A and 4B, is stored in a first register 516. In the jth candidate frame motion vector detection block 504, motion vectors for all of the pixels contained in the jth candidate frame are determined based on the feature point motion vectors multiplied by the jth skipped frame prediction factor from the multiplier 500 and the feature points from the feature point selection block 210(shown in FIG. 2) via a line L13. The operation of the jth candidate frame motion vector detection block 504 is identical to that of the aforementioned current frame motion vector detection block 214(shown in FIG. 2).

The motion vectors for all of the pixels from the jth candidate frame are provided to a jth candidate motion compensation block 506. The jth candidate motion compensation block 506 compensates the previous frame on the line L12 with all of the motion vectors from the jth candidate frame motion vector detection block 504, to thereby provide the jth candidate frame. The jth candidate frame is sent to a jth candidate frame memory 508 for its storage therein.

At a subtractor 510, the error between the jth candidate frame stored in the jth candidate frame memory 508 and an ith skipped frame on a line L8 is calculated on a pixel-by-pixel basis, and then the result is provided to a jth candidate frame error accumulation block 512 wherein the jth candidate frame error is accumulated. The jth candidate frame error is provided to a comparator 514 and a second register 518. In the comparator 514, the current input candidate frame error is compared with a previous candidate frame error stored in the second register 518 to provide an enable signal for the first and second registers 516 and 518. Whenever the current input candidate frame error is smaller than the previous frame error, the enable signal occurs. At this time, the skipped frame prediction factor of the previous candidate frame stored at the first register 516 is replaced with a new skipped frame prediction factor of the input candidate frame, and the error value stored at the second register 518 is revised with the input candidate frame error. After comparing the ith skipped frame with all of the candidate frames, the final skipped frame prediction factor stored at the first register 516 is produced onto the line L21 as a skipped frame prediction factor for the ith skipped frame.

Figure 6:
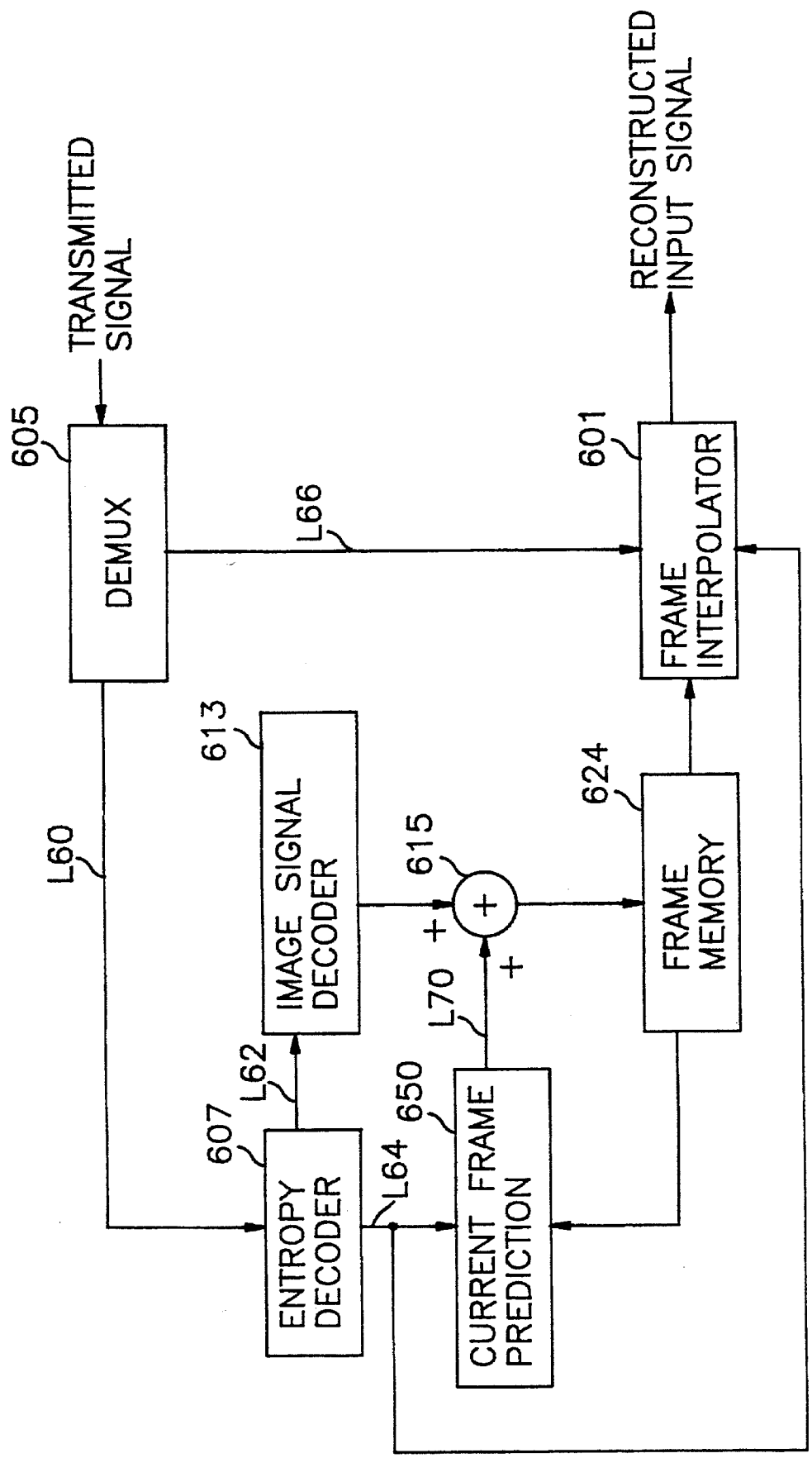
FIG. 6 illustrates a video signal decoder corresponding to the video signal encoder shown in FIG. 1.

Referring now to FIG. 6, there is shown a video signal decoder corresponding to the video signal encoder shown in FIG. 1. A transmitted signal from the video signal encoder is inputted to a demultiplexer 605 wherein the encoded signal is provided via a line L60 to an entropy decoder 607 and each skipped frame prediction factor for each of the skipped frames is provided via a line L66 to a frame interpolator 601. At the entropy decoder 407, the transmitted signal on the line L60 is decoded into the first set of motion vectors and the quantized transform coefficients. The motion vectors are provided to a current frame prediction block 650 and a frame interpolator 601 via a line L64 while the quantized transform coefficients are coupled to an image signal decoder 613 via a line L62.

The image signal decoder 613 converts the quantized transform coefficients back into the reconstructed error signal by employing an inverse quantization and an inverse discrete cosine transform.

The current frame prediction block 650 performs substantially the same operation as the current frame prediction process of the block 150 of the video signal encoder shown in FIG. 1, except that it provides the predicted current frame signal based on the previous frame signal stored in a frame memory 624 and the first set of motion vectors from the entropy decoder 607.

Therefore, the current frame prediction block 650 is of a similar structure to the current frame prediction part(excluding the skipped frame prediction block 218) of FIG. 2 except that there is no motion estimator such as the feature point motion vector detection block 212 shown in FIG. 2 because the first set of motion vectors transmitted from the encoder is provided thereto on the line L64.

At the feature point selection block of the decoder, feature points are reconstructed from the previous frame decoded and stored in the decoder in a similar manner as in the case of the encoder. In the current frame motion vector detection block of the decoder, a second set of motion vectors for all of the pixels contained in the current frame is estimated through the use of the first set of motion vectors and the feature points. In the motion compensation block of the decoder, each of the pixels to be contained in a predicted current frame is determined by translating each of the pixels in the previous frame utilizing each of the second set of motion vectors.

The reconstructed error signal from the image signal decoder 613 and the predicted current frame signal on the line L70 from the current frame prediction block 650 are combined at an adder 615, thereby providing the reconstructed current frame signal to the frame memory 624.

The reconstructed frame stored in the frame memory 624 is fed to the frame interpolator 601 wherein the N skipped frames between the previous frame and the current frame are reconstructed by using the skipped frame prediction factors from the demultiplexer 605 and the first set of motion vectors from the entropy decoder 607 as explained hereinafter.

To reconstruct an ith skipped frame between the previous and the current frames, a number of motion vectors and a corresponding number of pixel points in an ith skipped frame are first determined in response to an ith skipped frame prediction factor. Each of the corresponding number of pixel points in the ith skipped frame is determined by translating each of the feature points in the previous frame using the ith skipped frame prediction factor, (j-1)/(M-1), multiplied by one of the first set of motion vectors corresponding to said each of the feature points in the previous frame, and each of the number of motion vectors between said each of the corresponding number of pixel points in the ith skipped frame and said each of the feature points in the previous frame is determined by multiplying said one of the first set of motion vectors by the factor of (j-1)/(M-1). Thereafter, motion vectors for all of the pixels contained in the ith skipped frame using said number of motion vectors and the corresponding number of pixel points in the ith skipped frame is determined, and then the previous frame is compensated with the motion vectors for all of the pixels to estimate the ith skipped frame. Thereafter, the frame interpolator 601 controls the order of the output frames to reconstruct the input signal.

While the present invention has been shown and described with reference to the particular embodiments, it will be apparent to those skilled in the art that many changes and modifications may be made without departing from the spirit and scope of the invention as defined in the appended claims.

What is claimed is:

1. An image processing system for processing a video signal including means for encoding the video signal to provide a coded signal and means for decoding the coded signal to provide a reconstructed video signal, characterized in that said encoding means comprises:

means for selecting a plurality of frames, inclusive of a current frame and a previous frame, from the video signal, wherein N frames are skipped between the previous frame and the current frame, said N being a positive integer;

means for estimating displacements between the previous frame and the current frame to provide a first set of motion vectors representative of the estimated displacements and initially compensating the previous frame through the use of the first set of motion vectors to provide a predicted current frame on a pixel-by-pixel basis;

means for subtracting the predicted current frame from the current frame to provide a difference signal and encoding the difference signal and the set of motion vectors, to thereby provide an encoded difference signal and an encoded first set of motion vectors;

means for further compensating the previous frame by using the first set of motion vectors multiplied by M number of skipped frame prediction factors to provide M number of candidate frames, said M being a positive integer larger than N; and means for comparing each of the N skipped frames with each of the candidate frames to transmit one of the skipped frame prediction factors for each of the N skipped frames to the decoding means;

and that said decoding means comprises:

means for decoding the encoded difference signal and the encoded first set of motion vectors, to thereby recover the difference signal and the first set of motion vectors;

means for initially compensating the previous frame by using the recovered first set of motion vectors to reconstruct the predicted current frame;

means for adding the reconstructed predicted current frame with the recovered difference signal to thereby reconstruct the current frame; and means for further compensating the previous frame by using the recovered first set of motion vectors and each of the transmitted skipped frame prediction factors for each of the N skipped frames, to thereby construct each of the N skipped frames between the previous frame and the reconstructed current frame.

2. The apparatus of claim 1, wherein said estimating means in the encoding means includes:

means for selecting a number of feature points from the pixels contained in the previous frame, each of the feature points being a pixel point capable of representing the motion of an object therein;

means for comparing the previous frame and the current frame to detect the first set of motion vectors for each of the selected feature points, each of the first set of motion vectors representing a spatial displacement between one of the selected feature points in the previous frame and a most similar pixel thereto in the current frame;

means for deriving a second set of motion vectors for all of the pixels contained in the current frame based on the first set of motion vectors and the feature points; and means for compensating the previous frame with the second set of motion vectors to produce the predicted current frame.

3. The apparatus of claim 2, wherein said means for further compensating the previous frame in the encoding means includes:

means for determining a selected number of jth candidate frame motion vectors and a corresponding number of pixel points in the jth candidate frame, wherein each of the corresponding number of pixel points in the jth candidate frame is determined by translating each of the feature points in the previous frame using a skipped frame prediction factor, (j-1)/(M-1), multiplied by one of the first set of motion vectors corresponding to said each of the feature points in the previous frame, and each of the number of jth candidate frame motion vectors between said each of the corresponding number of pixel points in the jth candidate frame and said each of the feature points in the previous frame is determined by multiplying said one of the first set of motion vectors by the factor of (j-1)/(M-1);

means for determining an entire set of jth candidate frame motion vectors for all of the pixels contained in the jth candidate frame based on said selected number of jth candidate frame motion vectors and the corresponding number of pixel points in the jth candidate frame; and means for compensating the previous frame with the entire set of jth candidate frame motion vectors to thereby provide the jth candidate frame.

4. The apparatus of claim 3, wherein said means for further compensating the previous means in the decoding means includes:

means, in response to one of the transmitted skipped frame prediction factors, for determining a selected number of ith skipped frame motion vectors and a corresponding number of pixel points in an ith skipped frame, wherein each of the corresponding number of pixel points in the ith skipped frame is determined by translating each of the feature points in the previous frame using the transmitted skipped frame prediction factor, (j-1)/(M-1), multiplied by one of the first set of motion vectors corresponding to said each of the feature points in the previous frame, and each of the selected number of ith skipped frame motion vectors between said each of the corresponding number of pixel points in the ith skipped frame and said each of the feature points in the previous frame is determined by multiplying said one of the first set of motion vectors by the factor of (j-1)/(M-1);

means for determining an entire set of ith skipped frame motion vectors for all of the pixels contained in the ith skipped frame using said selected number of ith skipped frame motion vectors and the corresponding number of pixel points in the ith skipped frame; and means for compensating the previous frame with the entire set of ith skipped frame motion vectors to thereby provide the ith skipped frame.

* * * * *